United States Patent [19]

Horton

[11] Patent Number: 4,947,989
[45] Date of Patent: Aug. 14, 1990

[54] VIDEO TAPE BOX ADVERTISING SHOWCASE COVER SLEEVE

[76] Inventor: Azor R. Horton, P.O. Box 246, Inkster, Mich. 48141

[21] Appl. No.: 370,200

[22] Filed: Jun. 22, 1989

[51] Int. Cl.$^5$ .......................................... B65D 85/672
[52] U.S. Cl. ..................................... 206/387; 40/312; 40/427; 40/442; 40/546; 206/459; 220/351; 220/345
[58] Field of Search ...................... 40/152.1, 442, 541, 40/544, 546, 547, 312, 427; 206/387, 459, 232, 444; 220/345, 351, 346; 362/154

[56] References Cited

U.S. PATENT DOCUMENTS

| | | | |
|---|---|---|---|
| 2,551,622 | 5/1951 | Mohr | 40/546 |
| 2,560,392 | 7/1951 | Latrobe | 40/442 |
| 3,027,669 | 4/1962 | Hardesty | 40/546 |
| 3,276,618 | 10/1966 | Relich | 220/346 |
| 3,500,035 | 3/1970 | Franc | 40/541 X |
| 3,531,012 | 9/1970 | Bergh et al. | 220/345 |
| 3,647,279 | 3/1972 | Sharpless et al. | 40/427 X |
| 3,702,033 | 11/1972 | Coleman | 40/541 |
| 3,715,822 | 2/1973 | Hansen, Jr. et al. | 40/442 |
| 4,299,041 | 11/1981 | Wilson | 40/442 X |
| 4,363,081 | 12/1982 | Wilbur | 206/459 X |
| 4,607,747 | 8/1986 | Steiner | 206/459 X |
| 4,643,301 | 2/1987 | Hehn et al. | 206/387 X |
| 4,838,422 | 6/1989 | Gregerson | 206/444 |

FOREIGN PATENT DOCUMENTS 2520247 11/1976 Fed. Rep. of Germany ........ 40/541

Primary Examiner—Bryon P. Gehman
Attorney, Agent, or Firm—Richard C. Litman

[57] ABSTRACT

A video cassette storage container having a cover removably connected to a base portion. The cover is surrounded about its periphery by a series of lights that are programmed to flash in an eye-catching fashion. The cover is designed to contain any suitable printed indicia such as a description of the contents of the storage container or an advertisement. The lights are included to draw attention to the printed indicia encased within the cover below a transparent sheet of material. In an alternate embodiment, the lights about the periphery of the cover are activated by touch.

5 Claims, 2 Drawing Sheets

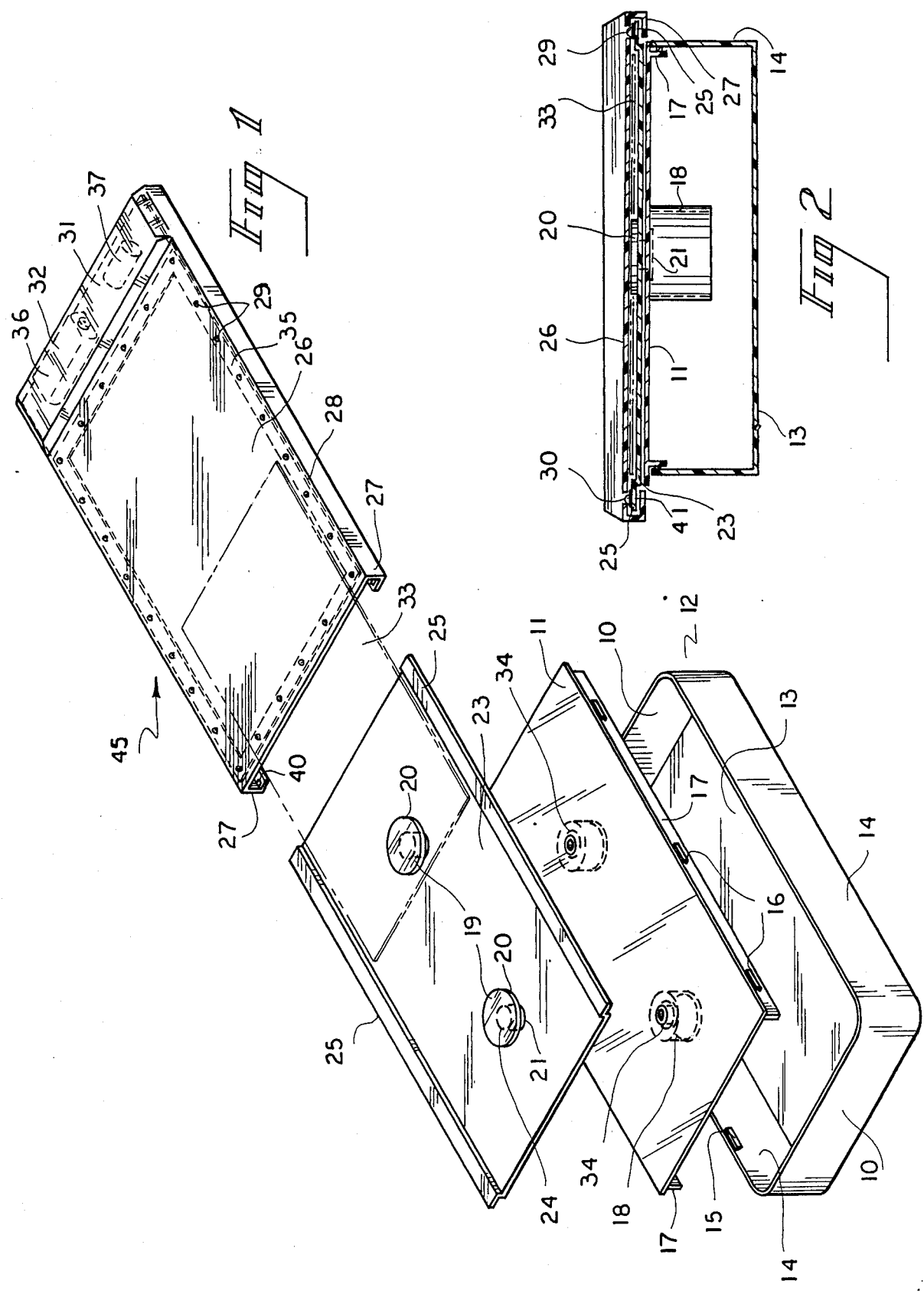

VIDEO TAPE BOX ADVERTISING SHOWCASE COVER SLEEVE

BACKGROUND OF THE INVENTION

1. Field of the Invention

The present invention relates to display boxes specifically designed to house a video cassette tape. More particularly, the present invention relates to an illuminated cover sleeve attachable to a video cassette storage container to attractively display an advertisement.

2. Description of the Prior Art

The development of boxes for the containment of video tapes is a relatively young art. Though young, there is considerable development in this particular area. Moreover, the advances in the area of video tape boxes is parallel with other media such as music. The following is a discussion of the prior art. The advantages of the present invention are specifically addressed.

U.S. Pat. No. 4,813,534 issued to H. Rosen on Mar. 21, 1989 discloses a display package. The display package taught by Rosen involves the use of a box having a window through which a description of the contents of the box may be viewed. Rosen also teaches a system of indexing for audio-visual material. The boxes are collapsible, and they may be folded and placed alphanumerically in a filing cabinet.

U.S. Pat. No. 4,627,531 issued to P. W. Clemens on Dec. 9, 1986 discloses a container for recording disks. Clemens teaches a unique means whereby the two main portions of the package may be attached and assembled. Clemens incorporates a gripping means on part of his package that resembles the gripping features of the present invention. The gripping means comprise protusions from a segment of the container that allow the container to be reliably closed. However, apart from this similarity, there is little relationship between Clemens and the present invention.

U.S. Pat. No. 4,643,301 issued to B. A. Hehn et. al. on Feb. 17, 1987 discloses a package wherein is placed a video cassette tape. Hehn teaches a cover design for a video cassette tape that can be placed over the cassette box. The cover is transparent. The transparent cover is designed to have printed material placed beneath it. The printed material may take the form of indicia indicative of the contents of the container, or it may take the form of advertising material.

The present invention discloses a new approach to display boxes for video cassette tapes, wherein a removable cover sleeve designed for displaying advertising or similar material is mounted to a container for storing a video cassette. Thus, the present invention adds a new dimension to the use of video cassette storage containers with associated display equipment.

The present invention goes still one step further by incorporating a string of lights about the periphery of the removable cover sleeve. The lights may be activated for continuous use to draw attention to any paid announcements or printed notices displayed through a window on the cover sleeve. Alternatively, the lights may be touch activated. The space reserved for announcements and notices may contain advertising material from any number of companies as well as indicia describing the contents of the video cassette storage box.

The current trend in purchasable movies incorporates advertising in the form of commercials as a pretext to the movie. Advertising added to the exterior of the container supplements that added to the video tape recorded information. As a result, the addition of external advertising increases the probability that a product will be viewed by the consumer. This, theoretically, should increase the sale of the particular product or the use of an advertised service.

The display attachment in accordance with the present invention incorporates a means to view printed indicia or graphic material through a transparent surface of a video cassette storage container. In addition, lights are included in the box design to attract a person's attention to the advertising or indicia there enclosed. In this manner, the present invention is a marked improvement over the prior art.

SUMMARY OF THE INVENTION

Accordingly, it is an object of the present invention to provide display attachment removably mounted to a cassette container.

It is a further object of the present invention to provide a removable display device for converting conventional types of video cassette containers into advertising showcases.

It is still another object of the present invention to provide a storage container with a transparent surface through which printed indicia may be viewed.

It is yet another object of the present invention to provide a video cassette storage box wherein the printed indicia are framed by a series of lights to draw a person's attention to the container.

It is another object of the present invention to provide a means to assemble the cover of the box in such a manner as to prevent the inadvertent removal of the printed indicia therein.

It is still another object of the present invention to provide a video cassette storage box whose lights are touch activated.

These and other objects are accomplished in accordance with the present invention by providing an improved display assembly removably mounted to a video cassette storage box comprising an illuminated cover sleeve which slidably engages an adaptor plate affixed to an exterior surface of the cassette box. The cover sleeve has a substantially planar surface and includes a transparent window extending throughout the majority of the extent of its planar surface. A plurality of lighting elements is serially spaced about the periphery of the transparent window within a border segment thereof. Electrical power supply means are housed within the cover sleeve of the display assembly which also includes electrical conductor means communicating with the lighting elements and switch means operable to illuminate the elements upon activation. The adaptor plate may be secured to the cassette container by any suitable affixing means.

The video cassette storage box employed in the present invention may be any one of a number of different types of cassette containers currently available in the market. One such container is an integrally molded rectangular-shaped box having a base section defining a cassette cavity and a displaceable lid for completely enclosing the cassette. The base section comprises a bottom wall surrounded by a pair of side walls and a pair of end walls which forms an enclosure. The displaceable lid comprises an outside flat face and an inside face presenting opposite end and/or side edges to secure the lid to the base section in a closed position for storing the cassette securely within the box. An edge of the displaceable lid may be hingedly mounted to a side wall of the base section. However, this particular container construction can vary without effecting the concept of the present invention as more specifically described hereinafter. The lid may also include a pair of spaced openings corresponding to axial holes for spools of a video cassette for securely affixing the adaptor plate disposed atop the outside flat face of the lid;

With these and other objects in view which will more readily appear as the nature of the invention is better understood, the invention resides in the novel combination and arrangement of parts hereinafter more fully described and illustrated, with reference being made to the accompanying drawings.

BRIEF DESCRIPTION OF THE DRAWINGS

FIG. 1 is an exploded view of the present invention showing all pertinent details.

FIG. 2 is a cross-sectional end view of the present invention showing the assembled version of the video cassette storage box.

Similar reference characters designate corresponding parts throughout the various figures of the drawings.

DESCRIPTION OF THE PREFERRED EMBODIMENT

Figure 3:
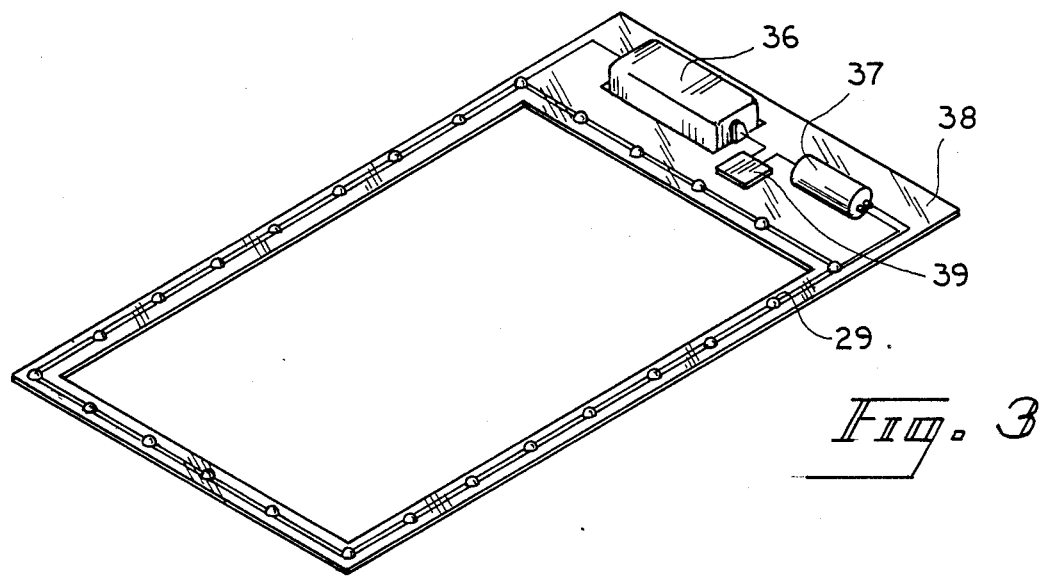
FIG. 3 is a perspective illustration of the printed circuit board of the present invention.

The video cassette storage box that may be employed as an alternative embodiment of the present invention is generally shown in FIG. 1 and comprises basically two separate parts. The first of these parts is the displaceable cover or lid 11. The second is the bottom or base section 12. The cover 11 fits over and removably attaches to the bottom section 12 by means of a series of gripping protrusions 15 located on the bottom section 12 and a matching set of locking stubs 16 on the underside of the cover 11. The gripping protrusions 15 and the locking stubs 16 meet with one another when the cover 11 is snapped into place on the bottom section 12. The engagement of the gripping means 15 and the locking stubs 16 allow for a reliable attachment of displaceable lid 11 to base section 12.

The base 12 is essentially composed of a planar bottom wall 13 surrounded on four sides by a pair of upstanding end walls 10 and a pair of side walls 14 to form a rectangular-shaped receptacle defining a cassette cavity. Extending inwardly along the upper most portion of the vertical side walls 14 are the gripping protrusions 15. The gripping protrusions 15 are simply small projections of material which are molded to the vertical pair of side walls 14. The gripping protrusions 15 can be rectilinear in shape as shown. However, they may be of any shape that will serve the function desired. Those familiar with the art will find this to be true.

The displaceable lid 11, as shown, contains opposite side edges 17 which extend vertically from the underside of the lid 11. The opposing side edges 17 provide a guide means when the cover 11 is placed onto the bottom section 12.

The lid 11 is simply a rectangular planar sheet of material whose dimensions match the dimensions of the rectangular base section 13. The opposite sides edges 17 are vertical protrusions that are molded to the interior face of the container lid and include the locking stubs 16 that mate with the gripping protrusions 15 of the base section 12 to provide a reliable connection between the lid 11 and base section 12 when the cassette container is in the closed position.

The lid 11 includes a pair of spaced holes 34 bored through its surface which holes are spaced such that they correspond with the axial 1 openings in the spools of the video cassette placed into the container. Surrounding these holes 34 are cylindrical protrusions 18. These cylindrical protrusions 18 are well known in the art. The cylindrical protrusions 18 are used to assure proper placement of a video cassette within the storage box 10. The cylindrical protrusions 18 insert into the spools of the video cassette. The pair of spaced holes 34 are used to fasten the adaptor plate 23 to the outside flat face of lid 11.

The adaptor plate 23 is essentially a planar piece of material having a pair of spaced apertures 24 therethrough. The pair of spaced apertures 24 and the pair of holes 34 are axially aligned. A pair of locking pins 19 is then placed through both the lid 11 and adaptor plate 23. The locking pins 19 hold adaptor plate 23 rigidly affixed to displaceable lid 11.

The locking pair of pins 19 is molded of flexible material and essentially T-shaped in cross-section. It has a flat head 20 and locking means 21 extending perpendicularly therefrom. The locking means 21 are simply two extensions with outwardly pointing protrusions. When the pin 19 is pushed through adaptor plate 23 and then through the lid 11, the locking means 21 are pushed through those same plates 23, 11. Since they are elastic, they expand to their normal positions after being pushed thorough the pertinent structures 23, 11. The protrusions extending from the locking means 21 prevent the inadvertent removal of the locking pins 19 and securely fasten the adaptor plate to the exterior of the cassette container.

The adaptor plate 23 contains outwardly turned flanges 25 along its sides. The flanges 25 extend the entire length of the two longest sides of the adaptor plate and 25 are essentially L-shaped structures. The flanges 25 engage attaching means of the present display assembly to permit the removable mounting of cover sleeve 45 to the adaptor plate.

The present display assembly comprises a substantially planar cover sleeve 45 having opposite side edges with inwardly turned flanges or 27 extending the length of its two longest sides. The inturned flanges or tracks 27 are essentially L-shaped members projecting downward from the side edges of the cover sleeve 45 and slide around the out-turned flanges 25 of the adaptor plate 23 to securely hold the assembly in a display position.

To prevent inadvertent removal of the display assembly stop means 40 located on inturned tracks 27 are provided. Indentations 41 are located on the underside of the out-turned flanges 25 to accept the stop means 40. The stop means 40 insert into the indentations 41 to prevent the cover sleeve 45 from sliding off of adaptor plate 23 to which it should be attached.

The cover sleeve 45 further comprises a transparent window 26 extending throughout the majority of the planar surface area of the display assembly. When the assembly of the present invention is in a display arrangement there is created a rectangular space between the window 26 and the adaptor plate wherein printed indicia 33 is placed. Since the window 26 is transparent, the indicia 33 may be read without the need to remove the cover sleeve 45.

The cover sleeve 45 of the presently improved display assembly contains a border segment or frame 28 surrounding the window 26 within which a plurality of lights 29 spaced apart from one another is serially arranged. The lights 29 29 may either protrude from the surface of the window 26 or they may be encased below the surface of the window 26. Light holes 30 are provided about the periphery of the window 26 should the lights 29 protrude through the window 26 surface.

The lights 29 may be lit continuously or they may be programmed to flash in a predetermined fashion. The lights 29 may be programmed to flash in a sequential fashion. Alternately, the lights 29 may be programmed simultaneously. In any case, the sequence in which the lights 29 may be activated are numerous. However, such sequences should be familiar to those skilled in the art.

The lights 29 around the window 26 are attached to a battery power supply 36 located at an opposing end section of the cover sleeve adjacent transparent window 26. The lights 29, the battery 36, and the capacitor 37 all connect to a circuit plate 38. The circuit plate 38 affixes to the underside of the cover sleeve. A battery compartment 32 is supplied to hold whatever size batteries may be needed to activate the lights 29. Next to the battery housing 32, there may be located a computer chip compartment 31. The computer chip 39 would control the sequential flashing of the lights 29 about the periphery of the window 26.

The window frame 28 may be covered with a thin coating of a conductive material 35 as well. The conductive material 35 would be connected to the computer chip 39 within the computer chip housing 31. Since a person would more than likely touch the conductive material 35 about the periphery of the window 26 when handling the display assembly of the present invention, the touch of the person is sensed. As a result of this touch, the lights 29 are activated in any predetermined sequence.

Touch sensitive controls are fairly well known to those skilled in the art. Simply put, a touch sensor detects a drop in capacitance that occurs when a person touches a piece of conductive material. The capacitor 37 located on the circuit plate 38 is the component that functions to sense the person's touch. Such a sensor would need to be incorporated into the computer chip housing 31. Thus, when the person touches the conductive periphery 35, the lights 29 are activated in whatever predetermined sequence is programmed into the computer chip.

The lights 29 are provided simply for their eye-catching characteristics. If the video cassette storage box of the present invention were placed on a shelf in a video rental store, the lights 29 would attract a person's attention to the video cassette. In this manner, it is expected that the rental of the particular cassette will increase. Additionally, if the indicia 33 viewed through the window 26 is an advertisement, the product advertised there is expected to be sold in larger quantities.

It is to be understood that the present invention is not limited to the sole embodiment described above, but encompasses any and all embodiments within the scope of the following claims.

I claim:

1. In a video cassette storage box provided with a rectangular-shaped base section defining a cassette cavity and a displaceable lid having an outside face and an inside face presenting opposite end and side edges to secure the lid to the base section in a closed position, the improvement comprising:
   an adaptor plate disposed atop said outside face of the displaceable lid;
   fastening means for affixing said adaptor plate to the outside face of said displaceable lid;
   a display assembly comprising a substantially planar cover sleeve including a transparent window extending throughout the majority of the surface area of said cover sleeve and a border segment surrounding said window;
   attaching means on said cover sleeve engageable with said adaptor plate to permit the removeable mounting of said display assembly to the adaptor plate;
   a plurality of lighting elements serially spaced about the periphery of said transparent window within said border segment; and
   an electrical power supply housed within said display assembly including an electrical conductor communicating with said lighting elements and switch means operable to illuminate the lighting elements, whereby
   upon activation of said switch means, said lighting elements are illuminated to draw visual attention to said diplay assembly and any printed material viewable through said window.

2. The improved video cassette storage box according to claim 1 wherein said display assembly includes inturned flanges extending along opposite side edges of said cover sleeve and said adaptor plate includes opposing side edges having outwardly turned flanges to permit the slidable engaging of the display assembly with the adaptor plate.

3. The improved video cassette storage box according to claim 2 wherein said outwardly turned flanges contain indentations and said inturned flanges contain stop means which are insertable in said indentations to prevent the removal of said cover sleeve from said adator plate.

4. The improved video cassette storage box according to claim 1 wherein said electrical conductor includes a computer chip mounted to a circuit board to regulate flashing patterns of said lighting elements.

5. The improved video cassette storage box according to claim 1 wherein said switch means comprises a touch sensitive device.

* * * * *